United States Patent [19]
Duemmler

[11] Patent Number: 5,195,669
[45] Date of Patent: Mar. 23, 1993

[54] COVERING CAP ASSEMBLY FOR A TRANSVERSE GIRDER OF A ROOF LUGGAGE CARRIER

[75] Inventor: Stephen Duemmler, Rodermark, Fed. Rep. of Germany

[73] Assignee: Votex GmbH, Dreieich, Fed. Rep. of Germany

[21] Appl. No.: 848,759

[22] Filed: Mar. 10, 1992

[51] Int. Cl.$^5$ ............................................. B60R 9/04
[52] U.S. Cl. .................................. 224/315; 224/309; 224/324
[58] Field of Search ............... 224/309, 315, 316, 322, 224/324, 328

[56] References Cited

U.S. PATENT DOCUMENTS

| | | | |
|---|---|---|---|
| 3,525,461 | 8/1970 | Bronson | 224/315 |
| 4,383,627 | 5/1983 | Ingram | 224/315 |
| 4,401,247 | 8/1983 | Zoor | 224/315 |
| 4,516,709 | 5/1985 | Bott | 224/315 |
| 4,640,450 | 2/1987 | Gallion et al. | 224/331 |
| 4,770,329 | 9/1988 | Kamaya | 224/315 |
| 4,848,112 | 7/1989 | Graber et al. | 224/315 X |
| 4,967,945 | 11/1990 | Bott | 224/326 |
| 4,995,538 | 2/1991 | Marengo | 224/329 |
| 4,997,117 | 3/1991 | Durm et al. | 224/315 |
| 5,025,967 | 6/1991 | Cronce et al. | 224/326 |

Primary Examiner—Allan N. Shoap
Assistant Examiner—Vanessa Caretto
Attorney, Agent, or Firm—Cort Flint

[57] ABSTRACT

The invention relates to a covering cap assembly (1) for a transverse girder (2) of a roof luggage rack designed so that a profiled forward end of the girder can be covered and locked. According to the invention the assembly is held together by a hinge (6) and consists of a covering cap (3) with a lock (4) and a bearing element (5). The bearing element (5) is inserted into a longitudinal slot at the underside (14) of the transverse girder (2) and is positioned and held in place interlockingly in the transverse profile. Retention in the longitudinal slot is provided by a locking element (21) and a rivet (24). In this way a simple construction of a cover cap assembly is had that is inexpensive in manufacture and assembly and is reliable in its functions and easy to handle.

13 Claims, 2 Drawing Sheets

COVERING CAP ASSEMBLY FOR A TRANSVERSE GIRDER OF A ROOF LUGGAGE CARRIER

BACKGROUND OF THE INVENTION

The invention relates to a covering cap assembly for the transverse girder of a roof luggage carrier of a vehicle to cover and lock the end face of a hollow interior defined by a profile of the girder.

Roof luggage carriers normally consist of transverse girder placed across and above the roof which are held in place and supported at the sides of the roof by supporting legs. In conventional vehicles the supporting legs are attached to the roof gutters by means of tensioning clamps. In modern, aerodynamically optimized vehicles, no roof gutters are provided, so that different, costlier devices with support plates and tensioning clamps are required (DE-OS 34 06 431). Furthermore vehicles are known in particular utility vehicles and off-the-road vehicles with a roof railing in form of a railing pipe extending longitudinally on either side of the roof. Roof luggage carriers consist in this case also of transverse girders which are connected to the railing pipes via tensioning devices.

All of these roof luggage carrier designs comprise transverse girders having high profiles of various cross-sectional configurations which normally have an open longitudinal channel with undercut groove to accept rubber covers and/or accessories.

The front or face ends of the transverse girder are normally covered by covering caps as they would otherwise catch dirt in the open uncovered profiles, as well as wind during travel which would cause unpleasant whistling noises.

A mere plug installed at the front end and clipped on is a known cover for a transverse girder front with a rectangular profile (DE-PS 35 16 483).

Another known covering cap arrangement (DE-PS 31 04 163) consists of a covering cap at the front end which can be inserted interlockingly into the transverse girder and which covers the front receiving opening of the longitudinal channel. A clamping screw is used to attach the transverse girder to a railing pipe of the roof railing. The covering cap is held in place after locking of an integrated lock, whereby a lock bolt engages a corresponding support on the transverse girder. In this arrangement the front end of the profile is on the one hand covered so as to be protected from dirt and noise. At the same time, the cap acts as a theft protection by securing the receiving opening in the longitudinal channel and the clamping screw which is used to remove the transverse girder. It is however a disadvantage that when replacing accessories such as bicycle carriers, boat carriers etc. as well as when the transverse girder is assembled with the screws, the covering caps used are removed as a separate part. This complicates the operation and furthermore involves the risk of losing the covering cap.

In a similar known embodiment (DE-OS 32 23 216) the covering cap is also held in a transverse girder profile so that it can be moved in a longitudinal direction. The insertion opening in the longitudinal channel and an assembly clamping screw are covered and protected against theft in the inserted and locked state. The covering cap in this case is held via a long, curved leaf spring in different extended positions in which it locks and is thereby connected to the transverse girder. The design of this embodiment is however costly and when handled roughly, the covering cap can obviously be pulled out of the transverse girder in spite of the spring arrangement provided.

Accordingly, an object of the invention is to provide a covering cap assembly for the face end of a transverse girder of a roof luggage carrier which cannot be lost and is easily handled, while being of simple design and having good functioning capability

SUMMARY OF THE INVENTION

The object is accomplished according to the present invention by providing a covering cap assembly which comprises a covering cap that covers the end profile of the transverse girder which can not be removed. This covering cap comprises an integral lock which reaches behind a support abutment fixed to the transverse girder. According to the invention a bearing element is used which is affixed to the transverse girder. The covering cap with the integrated lock and the bearing element constitute a preassembled covering cap assembly unit. For this purpose the covering cap is connected to the bearing element by a hinge so that the covering cap can be swivelled towards and away from the end of the profile end opening.

To attach the bearing element to the transverse girder, the girder has a longitudinal slot at each of its ends, in the underside of its hollow profile. The slot is open towards the end face. The bearing element is provided with laterally spaced, longitudinally extending grooves by which it is interlocked into the longitudinal slot in an area below a longitudinal channel. There are longitudinal edges along the longitudinal girder slot which engage the longitudinal grooves of the bearing element. The bearing element is secured by means of known holding means such as pins, screws, adhesive connections, etc., so that it cannot be pulled out.

It is advantageous if the assembly consisting of the covering cap with the lock and the pivotally connected bearing element can be pre-assembled. This preassembled unit, can be manufactured independently of the remaining roof luggage carrier body and can be used with different types of vehicles. The installation and assembly on the transverse girder can be carried out in a rapid, simple, and inexpensive manner because of the assembly being held in the longitudinal slot. A receiving opening of the longitudinal slot and, if necessary, clamping screws of the clamping device are covered and secured in such manner that they can be locked. The covering cap is connected through the hinge connection to the bearing element and to the transverse girder in such a manner that it cannot be lost. Because the covering cap is pivotally attached it can be swivelled away from the forward end, and the entire forward area becomes easily accessible when accessories are to be changed, or to attach or remove the roof luggage carrier.

Due to guide ribs near the longitudinal edges of the longitudinal slot, this area is reinforced overall. When heavier loads are involved, tilting loads bear upon the profile of the transverse girder which may lead to twisting and stretching in the area of the longitudinal slot. In order to avoid this, the invention provides that the longitudinal grooves on the bearing element be given an appropriate negative longitudinal groove profile which receives the guide ribs and overlaps them, so that the longitudinal slit is held together when it is under load.

Since the bearing element is fixedly and permanently connected to the transverse girder, the lock latch can be provided directly on the bearing element. This is advantageous because the lock is part of the preassembled unit consisting of the covering cap, lock, and bearing element. The lock adjustment, in particular with respect to the action of the lock latch against the support, can be effected during pre-assembly.

The pivoting axis of the hinge is preferably oriented horizontally and transversely and is located between the covering cap and bearing element, preferably in the lower region of the bearing element. In this manner the covering cap swivels down under the action of its own weight when the lock is opened and remains in this position without interfering with work at the end face of the transverse girder. The covering cap is then simply swivelled up and locked.

There is an especially inexpensive way to attach the bearing element after insertion into the corresponding longitudinal slot. For this purpose the longitudinal slot is enlarged by a round opening, larger than the width of the slot. In this enlargement or round opening, a locking element, preferably in form of a locking disk is inserted interlockingly. It is impossible to displace it in the direction of the longitudinal slot. The bearing element is provided with a horizontal receiving slit which is open towards the center of the transverse girder. The bearing element can be fitted over the locking element in course of installation so that the locking element is fixed in the enlargement by the walls of the receiving slit in a vertical direction to the longitudinal slot. The slit walls are connected by means of a rivet through the locking element, preferably through a hole in the locking element. In this manner the bearing element is permanently fixed in the longitudinal slot via the locking element. Such a fixed installation can obviously be realized easily, at low cost, permanently and in a stable manner. In order to ensure that the locking element or locking disk does not fall into the hollow profile during insertion into the round opening in the longitudinal slot, a flange contact edge is provided to assist in assembly.

For installation on the motor vehicle, detachable clamping devices are provided on the roof luggage carrier or on the transverse girder. These clamping devices can consist of support elements and clamping jaws which are also inserted into the longitudinal girder (towards the center of the transverse girder) before the covering cap. A clamping device designed in this manner, e.g. for attachment to a roof railing, is actuated by means of a clamping screw bolt extending inside the transverse girder in its longitudinal direction. Such a clamping screw bolt may be turned by means of a screwdriver or a hexagonal wrench. A guide channel in the bearing element extends in the longitudinal direction of the transverse girder to assist in the introduction of such a tool. The guide channel is accessible and acts as a tool guide when the covering cap is opened. In this way the handling required to install and to remove the roof luggage carrier on the vehicle is further improved.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF PREFERRED EMBODIMENT

Figure 1:
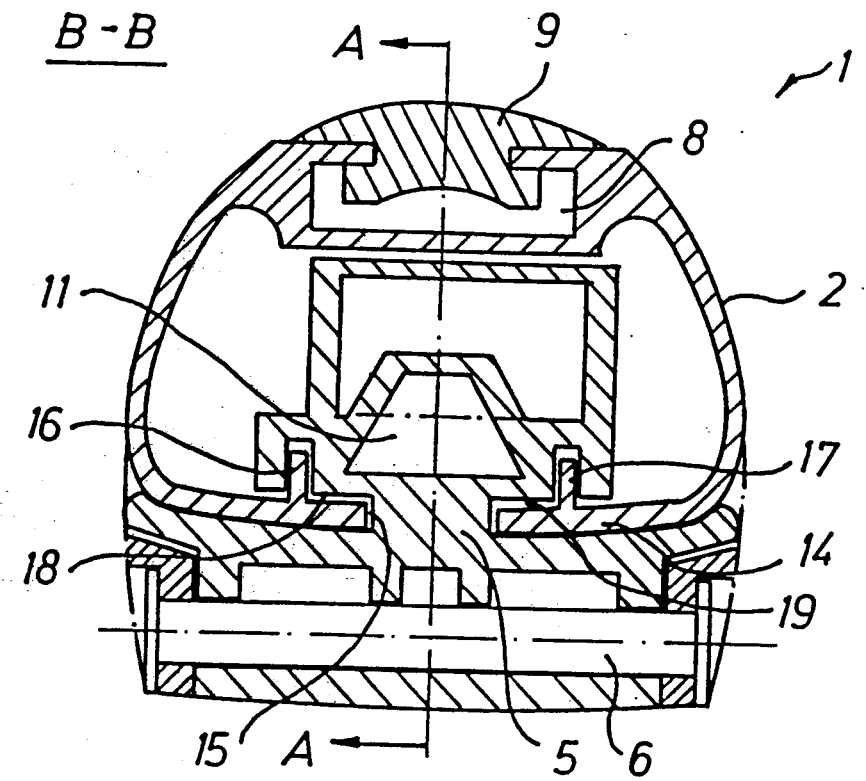
FIG. 1 illustrates a lateral cross-section through a transverse girder of a roof luggage carrier and a covering cap assembly according to the invention taken along section line B-B of FIG. 2
Figure 2:
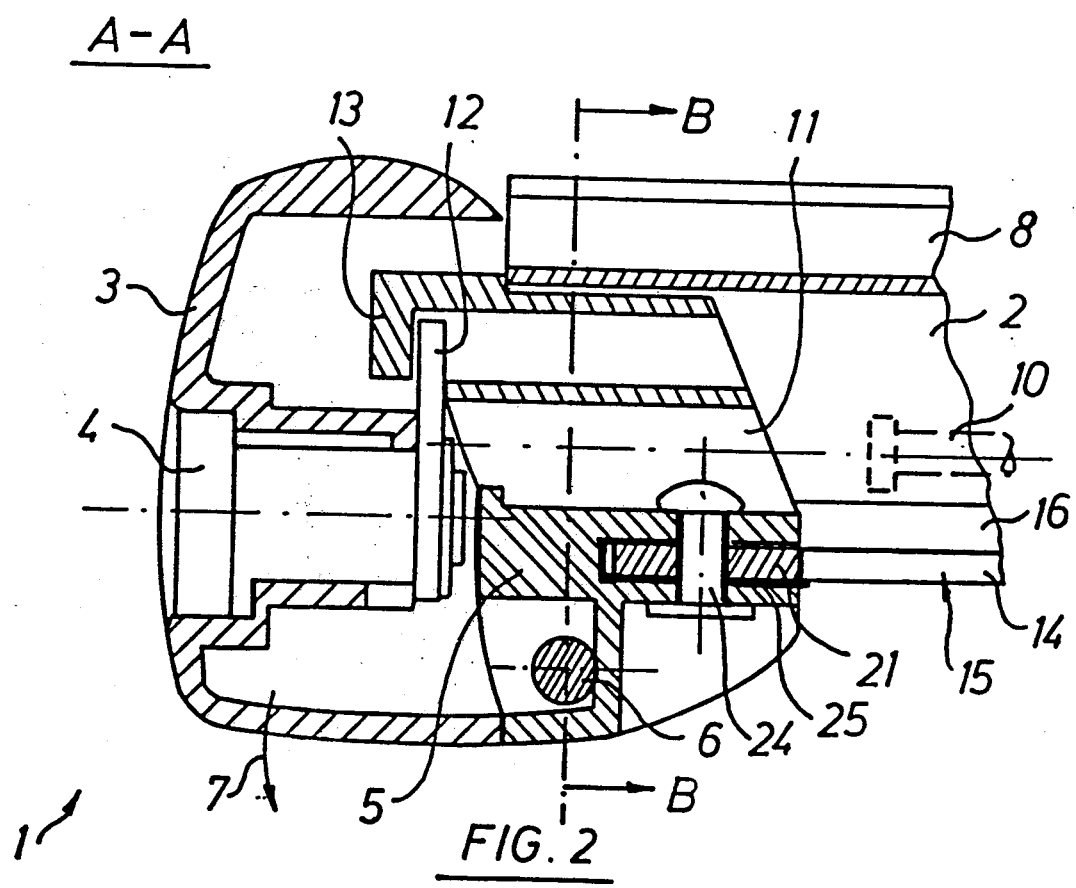
FIG. 2 illustrates a longitudinal section taken along line A-A of FIG. 1.

Referring now in more detail to the drawings, FIGS. 1 and 2 show a lateral cross-section and a longitudinal cross-section of a covering cap assembly 1 for a transverse girder 2 of a roof luggage carrier. Covering cap assembly 1 includes a covering cap 3, an integral lock 4 capable of being locked with a key, and of a bearing element 5 connected to the transverse girder 2.

Bearing element 5 and covering cap 3 are connected pivotally through a hinge bolt 6, so that covering cap 3 and lock 4 can be opened downward (arrow 7) away from the end face of transverse girder 2. Hinge bolt 6 is installed in a lower area of bearing element 5 for this purpose.

The profile of transverse girder 2 has rounded lateral walls and a longitudinal channel 8 open to the top, which receives a rubber cover 9 and/or accessories such as bicycle or boat carriers. Covering cap 3 is made in such a size that it covers the end face of longitudinal channel 8 with its upper part when it is raised and locked (FIG. 2), so that no unauthorized removal of holding devices from the longitudinal channel is possible.

At the sides of transverse girder 2, known holding and clamping devices are installed for attachment to the roof of the vehicle, and of these only a clamping/screw bolt 10 is shown, extending in the longitudinal direction of the transverse girder. To attach the roof luggage carrier or to remove it from the roof of the vehicle, this clamping/screw bolt 10 is turned with a tool, e.g. with a screwdriver or a hexagonal wrench, at the front of the transverse girder 2. An appropriate guide channel 11 is incorporated into the bearing element 5 in the direction of the clamping/screw bolt 10 to serve as a tool guide for this purpose. When covering cap 3 is raised and locked, guide channel 11 is also covered, so that the assembly is protected against unauthorized removal of the roof luggage carrier.

Lock 4 contains a pivotable latch bolt 12 which engages behind a abutment 13 of bearing element 5 to serve as support in the locked state.

Figure 3:
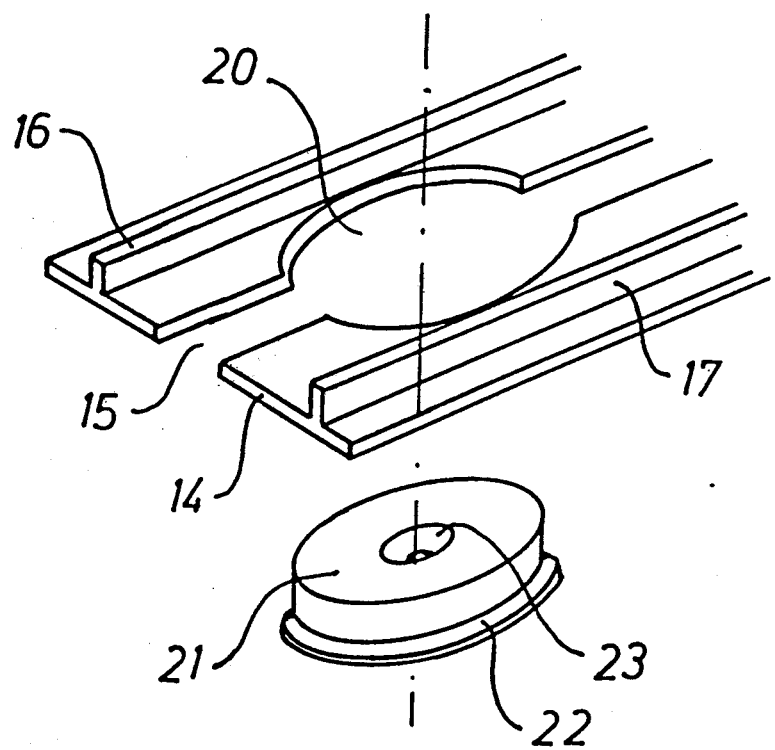
FIG. 3 illustrates partial perspective view of an underside of a longitudinal section of a transverse girder and a locking disk to attach a bearing element according to the invention.

The manner of attaching bearing element 5 to transverse girder 2 is explained through FIG. 3, which represents a perspective end view of the underside 14 of the transverse girder profile with parts omitted for clarity.

A longitudinal slot 15 is open towards the end face and includes guiding ribs 16, 17 which are slightly offset from the longitudinal edges of slot 15. Bearing element 5 is inserted into longitudinal slot 15 below longitudinal channel 8 whereby appropriate longitudinal grooves 18, 19 are provided to receive guiding ribs 16, 17 which they overlap. As a result longitudinal slot 15 is held together and secured against stretching. The bearing element 5 is held stable in all profile directions of the transverse girder 2 by this interlocking connection.

To secure and permanently attach bearing element 5 at the longitudinal slot 15 in the direction of insertion, longitudinal slot 15 is widened by a round opening 20. In opening 20 a locking disk 21 is inserted interlockingly which is supported from below at a contact edge or flange 22 against the underside 14 so that it cannot enter the interior of the hollow profile. Furthermore locking disk 21 is provided with an attachment opening 23 to receive a blind rivet 24.

Bearing element 5 is provided with a horizontal receiving slit 25 fitted with a lower and upper wall of opening 20 and locking disk 21. Slit 25 opens towards the center of the transverse girder. The receiving slit walls are connected via rivet 24 to locking disk 21. Disk 21 is fixed and cannot be displaced in the direction of the longitudinal slot because of its dimensions which are greater than the width of longitudinal slot 15. Bearing element 5 is also fixed in longitudinal slot 15 so that it cannot be displaced.

An assembly consisting of covering cap 3, lock 4, and bearing element 5 constitutes an integral assembly which can be pre-assembled and easily connected to transverse girder 2 through insertion and installation of blind rivet 24. Protection of the open end face of the transverse girder 2 and protection against theft is achieved by means of the covering cap assembly, whereby covering cap 3 is held so that it cannot be lost and is easily handled.

While a preferred embodiment of the invention has been described using specific terms, such description is for illustrative purposes only, and it is to be understood that changes and variations may be made without departing from the spirit or scope of the following claims.

What is claimed:

1. A covering cap assembly for a transverse girder of a roof luggage carrier to cover and lock a profiled forward end, said covering cap being movable toward and away from said forward end, a lock installed in the covering cap, and said lock having a latch which engages behind a support abutment carried by said transverse girder, and said transverse girder has a hollow profile containing a longitudinal channel with undercuts which is open at the top to receive accessories, said assembly comprising;
   a bearing element adapted for connection to said transverse girder;
   a covering cap carried by said bearing element;
   a lock carried by said covering cap;
   said covering cap pivotally carried by said bearing element so that said covering cap may pivot toward and away from said profiled forward end;
   said transverse girder having a longitudinal slot included in said hollow profile towards said forward end of said transverse girder;
   said bearing element being received in said longitudinal slot and including longitudinal grooves which engage longitudinal edges of said longitudinal slot and;
   retaining means for securing said bearing element in said longitudinal slot.

2. The assembly of claim 1, wherein said longitudinal edges of said longitudinal slot are provided with guiding ribs projecting upwards inside said hollow profile, and said longitudinal grooves of said bearing element have a corresponding negative longitudinal groove profile which receives and overlaps said guiding ribs.

3. The assembly of claim 1 including an abutment carried by said bearing element which is engaged by said latch of said lock.

4. The assembly of claim 1 including a hinge installed between said covering cap and said bearing element in a lower region of said bearing element which has an axis oriented horizontally and transversely to said transverse girder.

5. The assembly of claim 1 wherein said retaining means includes:
   a widened enlargement formed in said longitudinal slot;
   a locking element inserted into said enlargement;
   said bearing element having a horizontal receiving slit open towards a center of said transverse girder which receives said locking element when assembled; and
   said slit having walls which are connected to each other through the locking element by a connecting means so that said bearing element is secured through said locking element against removal from said longitudinal slot.

6. The assembly of claim 5 wherein said locking element is provided with a contact flange.

7. The assembly of claim 1 wherein said bearing element includes a guiding channel which is accessible when said covering cap is open and which extends in the longitudinal direction of said transverse girder; and said guiding channel is adapted for alignment with a clamping screw located inside said transverse girder.

8. A covering cap assembly for a transverse girder of a roof luggage carrier having a hollow profile to cover and lock a profiled forward end of said transverse girder, said covering cap being movable away from and toward said forward end, said assembly comprising:
   a bearing element adapted for connection to said girder;
   a covering cap carried by said bearing element;
   a lock carried by said covering cap, and said lock having a latch which engages behind a support abutment carried by said bearing element;
   said covering cap pivotally carried by said bearing element so that said covering cap may pivot toward and away from said profiled forward end; and
   retaining means for affixing said bearing element in said hollow profile of said transverse girder.

9. The assembly of claim 1 wherein said transverse girder has a longitudinal slot included in a hollow interior profile which is towards said forward end of said transverse girder; said bearing element being received in said longitudinal slot; guiding ribs projecting upwards near an edge defining said longitudinal slot inside said hollow profile; and said bearing element including longitudinal grooves which receive and overlap said guiding ribs.

10. The assembly of claim 9 wherein said retaining means includes:
   a widened enlargement formed in said longitudinal slot;
   a locking element inserted into said enlargement,
   said bearing element having a horizontal receiving slit that is open towards a center of said transverse girder for pushing over said locking element when assembled; and
   said slit having walls which are connected to each other through the locking element by a connecting means so that said bearing element is secured through said locking element against being pulled out of said longitudinal slot.

11. The assembly of claim 10 wherein said locking element is provided with a contact flange.

12. The assembly of claim 8 including a hinge installed between said covering cap and said bearing element in a lower region of said bearing element which has an axis oriented horizontally and transversely to said transverse girder.

13. The assembly of claim 8 wherein said bearing element includes a guiding channel which is accessible when said covering cap is open and which extends in the longitudinal direction of said transverse girder; and said guiding channel is adapted for alignment with a clamping screw located inside said transverse girder.

* * * * *